Dec. 29, 1942.                L. G. PENDER                2,306,975
                    FASTENER AND FASTENER INSTALLATION
                           Filed May 3, 1940
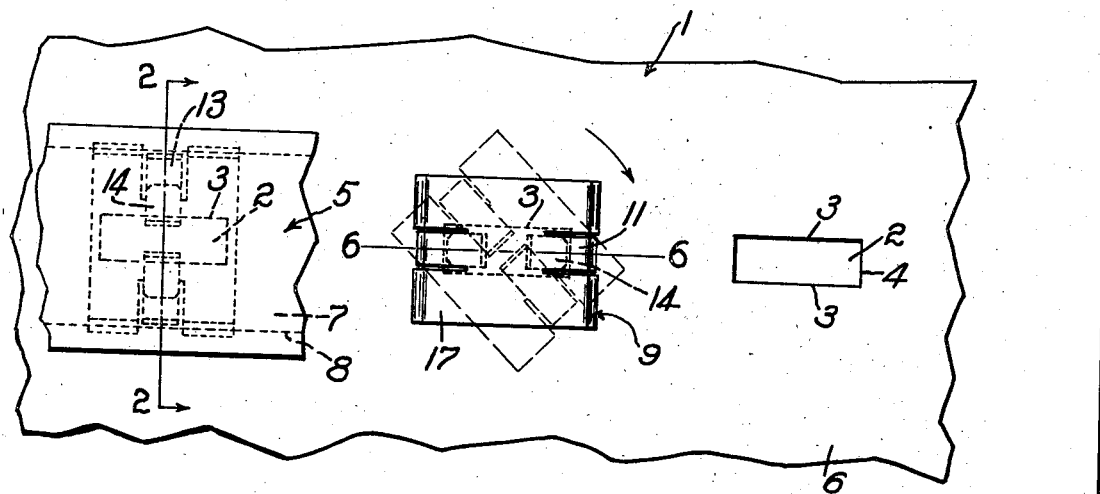
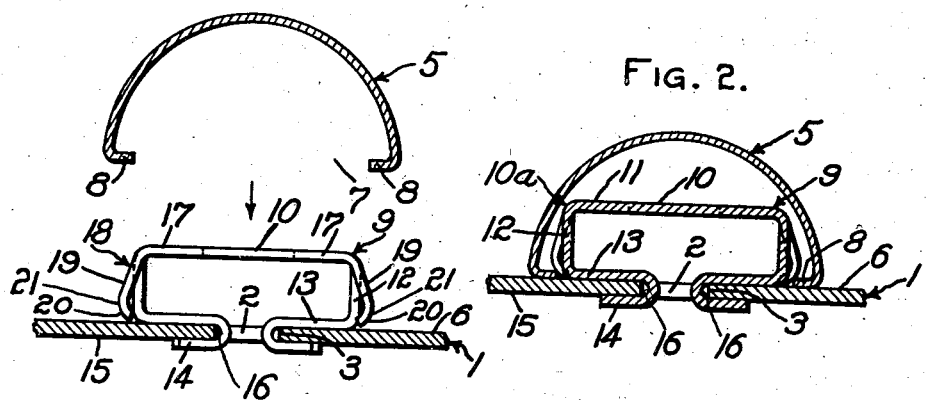
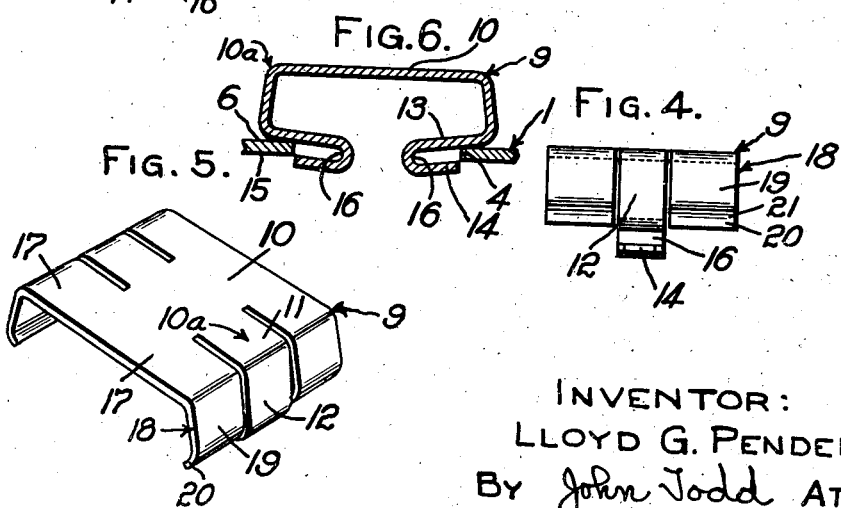
INVENTOR:
LLOYD G. PENDER,
BY John Todd ATTY.

Patented Dec. 29, 1942

2,306,975

UNITED STATES PATENT OFFICE 2,306,975

FASTENER AND FASTENER INSTALLATION

Lloyd G. Pender, Detroit, Mich., assignor to United-Carr Fastener Corporation, Cambridge, Mass., a corporation of Massachusetts Application May 3, 1940, Serial No. 333,155

7 Claims. (Cl. 189—88)

This invention relates to improvements in fastener members and fastener installations.

One object of my invention relates to a fastener member of simple and inexpensive construction adapted to be quickly and easily attached to a supporting panel and providing snap fastener means on the outer side of the panel for engagement with another part such as a supporting strip to secure the strip to the panel.

Another object of my invention is the provision of a fastener adapted to be secured to a panel by a rotating movement and having panel-engaging portions projecting a minimum distance beyond the inner side of the panel so as to be applicable where there is not a great deal of clearance.

Other objects and uses of my invention will be apparent from inspection of the drawing and specification hereinbelow set forth.

Referring to the drawing, in which I have illustrated a preferred embodiment of my invention:

Fig. 1 is a plan view of a supporting panel showing a portion of a molding strip secured thereto by my improved fastener member and also showing a method by which my improved fastener is assembled with the panel;

Fig. 2 is an enlarged section taken along the line 2—2 of Fig. 1;

Fig. 3 is a side elevation partly in section showing my improved fastener member in fastened assembly with the panel and a molding strip in position to be engaged with the fastener member;

Fig. 4 is an end view of my improved fastener member per se;

Fig. 5 is a perspective view of my improved fastener member per se; and

Fig 6 is a section taken on the line 6—6 of Fig. 1.

My invention, as illustrated in the accompanying drawing, relates particularly, though not exclusively, to a fastener secured installation in which hollow molding strips and the like are quickly and easily attached to a supporting structure such as the body of an automobile by means of my improved fastener member. The particular installation shown in the drawing by which I have chosen to illustrate the use of my improved fastener member comprises a supporting panel 1, which may be the body of an automobile. The supporting panel 1 has an aperture 2 which is preferably of rectangular shape bordered by opposed longitudinal walls 3 and opposed transverse walls 4. A molding strip 5 of the type now frequently used for ornamenting the exteriors of automobile bodies is adapted to be secured in flush relation to the outer surface 6 of the panel 1.

The strip 5, in my preferred form, is of hollow construction and has an aperture 7 running longitudinally of one of its sides and inwardly extending flanges 8—8 in adjacent relation to the aperture 7 along its length.

Referring to my improved fastener member 9, I have shown one of sturdy construction preferably made from one piece of spring metal. The fastener has a base portion 10 intermediate its ends and yieldable legs 10a (Figs. 2 and 5) extending from opposite ends of the base portion. The legs have portions 11 in the plane of the base 10 extending outwardly from the ends of the base and depending portions 12 extending downwardly from the outer ends of the portions 11, viewing Figs. 2 and 3, and terminating in spaced relation to the base 10 and to each other. Land portions 13 extend inwardly from the terminations of the depending portions 12 a predetermined distance toward each other and complementary or free end portions 14 extend reversely from the spaced inner ends of the land portions. The free end portions 14 are disposed in spaced substantially parallel relation to the respective land portions 13 so as to cooperate with the land portions to provide a pair of hook-shaped portions in opposite relation and opening in opposite directions. The portions 14—14 form an elongated end having a length which is less than the major axis of the aperture 2, but greater than the minor axis. It will be seen that the free end portions 14 are spaced from the respective land portions 13 a distance only slightly greater than the thickness of the panel 1 whereby the inner surfaces of the land portions and free end portions lie in flush engagement with the outer surface 6 and the inner surface 15 of the panel when the fastener is in final assembly with the panel. Also, the normal distance between ends of the hook-shaped portions adjacent the bights 16—16 thereof is greater than the minor axis of the panel aperture 2 so as to effect movement of the hook-shaped portions toward each other on engagement thereof with the longitudinal edges 3 of the aperture on rotative movement of the fastener, as will be described.

As a means of securing the strip 5 to the fastener, I have provided two pairs of yieldable locking fingers which extend from the same ends of the base 10 as the legs 10a. The locking fingers of each pair are preferably disposed on opposite sides of the respective portions 11 of the legs 10a and provide outwardly extending portions 17 disposed in the plane of the base 10. Locking portions 18 (Fig. 5) form continuations of the portions 17 and provide portions 19 extending downwardly and outwardly and portions 20 extending inwardly to form shoulders 21 (Fig. 3). The shoulders 21 are spaced slightly from the outer surface 6 of the panel 1 when the fastener is assembled with the panel to permit engagement of the flanges 8—8 of the strip 5 therebehind. The camming portions 19—19 are spaced apart at predetermined points thereon a distance greater than the width of the opening 7 with the result that the locking fingers are contracted upon engagement thereof with the flanges 8—8 of the strip during attachment of the parts.

Assembly of the parts of my installation is a relatively simple matter and is carried out through first moving the outwardly extending portions 14—14 through the opening 2 in registering relation to the openings, as most clearly shown in Fig. 6. In this position the land portions 13—13 will engage the outer surface 6 of the panel 1. The fastener is then rotated, as shown by the arrow in Fig. 1, to receive the longitudinal edges 3 of the apertures 2 between the land portions 13 and the outwardly extending portions 14 of the respective hook-shaped portions. As the inner radii of the bights of the hook-shaped portions engage the edges 3, the legs 10ª are contracted, which contraction is progressively increased until the hook-shaped portions are disposed in final position with the aforesaid end formed by the portions 14—14 in transverse relation to the length of the aperture 2, as shown in Figs. 2 and 3. The tendency of the legs 10ª to return to normal spaced-apart position effects a resilient engagement between the hook-shaped portions and the edges 3 aiding to maintain the fastener in position. In assembling the strip 5 with the fastener, the inwardly extending flanges 8—8 are moved in the direction shown by the arrow of Fig. 3 to engage the camming portions 19—19 and pressure is exerted upon the top of the molding to force the flanges 8—8 over the camming portions by a snap action.

It will be seen that by my invention I have provided a fastener of inexpensive construction which is easily assembled with a supporting panel so as to be positively secured thereto. At the same time the fastener projects beyond the inner surface of the supporting panel a distance no greater than the thickness of the stock from which it is formed. As a result, my fastener is particularly useful for automotive or other uses where it is desirable to provide backing, insulating, or sealing material at the inner side of the panel and substantially flush with the inner surface of the panel. Furthermore, my improved fastener member, after anchorage to a support, is capable of snap fastener engagement with a molding strip through an opening thereof on relative movement of the parts to draw the strip tightly against the outer surface of the supporting panel.

Although I have illustrated and described a preferred embodiment of my invention, I do not wish to be limited thereby because the scope of my invention is best defined by the following claims.

I claim:

1. A fastener member for securing an apertured strip to an apertured supporting panel, said fastener having a base portion adapted for assembly with said strip, and leg portions extending from said shape, said leg portions having oppositely disposed hook-shaped portions opening in opposite directions to receive opposed edges of the panel aperture, and each of said hook-shaped portions having panel-engaging portions providing opposed broad surfaces in spaced parallel relation for engaging said panel, and yieldable fastener means connected to the opposed sides of said base for engaging the apertured strip to be supported on said panel.

2. A fastener member for securing an apertured strip to an apertured supporting panel, said fastener having a base portion adapted for assembly with said strip, and leg portions extending from said base, said leg portions having oppositely disposed hook-shaped portions opening in opposite directions to receive opposed edges of the panel aperture, each of said hook-shaped portions having opposed broad surfaces in spaced parallel relation for engaging opposite surfaces of said panel, and said leg portions being flexible to permit relative movement of said hook-shaped portions toward and away from each other when turned into engagement with opposed walls of an elongated panel aperture, and yieldable fastener means connected to the opposed sides of said base for engaging the apertured strip to be supported on said panel.

3. A fastener member for securing an apertured strip to the outer surface of an apertured supporting panel, said fastener having a portion intermediate its ends in the form of a base, yieldable leg portions extending from respective ends of said base having hook-shaped portions at their ends away from said base, said hook-shaped portions being oppositely disposed and opening in opposite directions to receive opposed edges of the panel aperture, said hook-shaped portions having a land portion engaging an outer surface of said panel and a complementary portion having its broad surface in spaced parallel relation to said land portion engaging an inner surface of said panel, and yieldable fastener means connected to the opposed sides of said base for engaging the apertured strip to be supported on said panel.

4. A fastener member for securing an apertured strip to an apertured supporting panel, said fastener having a portion intermediate its ends in the form of a base, locking finger portions extending from respective ends of said base, said fingers being capable of relative flexure to engage said strip through an aperture thereof, leg portions extending from said ends of said base from which said fingers extend terminating in spaced relation to the base and to each other, land portions extending inwardly from the ends of said leg portions in spaced relation to said base and outwardly extending free end portions in spaced parallel relation to said land portions and complementing said land portions to form broad surfaced hook-shaped portions, said hook-shaped portions being oppositely disposed and opening in opposite directions to receive opposed edges of the panel aperture, and said leg portions being flexible to permit relative movement of said hook-shaped portions toward and away from each other when turned into engagement with opposite walls of an elongated panel aperture.

5. A fastener secured installation comprising a panel having an elongated aperture, a hollow strip and a fastener member securing said strip to an outer surface of said panel, said fastener having snap fastener means snapped into said strip and also having leg portions providing oppositely disposed hook-shaped portions opening in opposite directions, said hook-shaped portions forming an elongated end movable through said panel aperture in one predetermined position only and rotatable to receive opposed edges of the panel surrounding said aperture and said hook-shaped portions having opposed broad surfaces in flush engagement with opposite surfaces of said panel.

6. A fastener secured installation comprising a panel having an elongated aperture, a hollow strip and a fastener member securing said strip to an outer surface of said panel, said fastener having a base portion seated within said strip and yieldable leg portions extending from said base having hook-shaped portions at their respective ends away from said base, said hook-shaped portions being oppositely disposed and opening in opposite directions to receive opposed edges of the panel aperture, each of said hook-shaped portions having a land portion having its broad surface in flush engagement with said outer surface of said panel and a free end portion in spaced parallel relation to said land portion having its broad surface in flush relation to the inner surface of said panel, said hook-shaped portions forming an elongated end movable through said aperture of said panel in one predetermined position only and rotatable to receive the longer edges of said panel aperture between said respective land and free end portions.

7. A fastener secured installation comprising a panel having an elongated aperture, a hollow strip and a fastener member securing said strip to an outer surface of said panel, said fastener having a base intermediate its ends disposed on the outer side of said panel and yieldable leg portions extending from said base having hook-shaped portions at their respective ends away from said base, said hook-shaped portions being oppositely disposed and opening in opposite directions to receive opposed edges of the panel aperture, each of said hook-shaped portions having a land portion in engagement with said outer surface of said panel and a free end portion in spaced relation to said portion engaging the inner surface of said panel, said hook-shaped portions forming an elongated end movable through said aperture in one predetermined distance only and rotatable to receive the longer edges of said panel aperture between said respective land and free end portions, said free end portions extending beyond said inner surface a distance no greater than the thickness of said leg portions, and flexible locking fingers integral with said base and engageable within the strip through an aperture thereof by flexure of said fingers.

LLOYD G. PENDER.

CERTIFICATE OF CORRECTION.

Patent No. 2,306,975. December 29, 1942.

LLOYD G. PENDER.

It is hereby certified that error appears in the printed specification of the above numbered patent requiring correction as follows: Page 2, first column, line 72, after the word "said" first occurrence, for "shape" read --base--; and that the said Letters Patent should be read with this correction therein that the same may conform to the record of the case in the Patent Office.

Signed and sealed this 6th day of April, A. D. 1943.

Henry Van Arsdale,
Acting Commissioner of Patents.

(Seal)